United States Patent
Tang

(10) Patent No.: US 8,278,796 B2
(45) Date of Patent: Oct. 2, 2012

(54) STATOR STRUCTURE, AND MOTOR AND FAN ASSEMBLY USING SAME

(75) Inventor: Sam Tang, Sinjhuang (TW)

(73) Assignee: Asia Vital Components Co., Ltd., Taipei County (TW)

( * ) Notice: Subject to any disclaimer, the term of this patent is extended or adjusted under 35 U.S.C. 154(b) by 386 days.

(21) Appl. No.: 12/618,786

(22) Filed: Nov. 16, 2009

(65) Prior Publication Data

US 2011/0116943 A1    May 19, 2011

(51) Int. Cl.
*H02K 21/16*        (2006.01)
*H02K 7/00*         (2006.01)
(52) U.S. Cl. ...... 310/210; 310/67 R; 310/268; 360/99.08
(58) Field of Classification Search ................ 310/67 R, 310/208, 268, 210; 360/98.07, 99.08, 99.09
See application file for complete search history.

(56) References Cited

U.S. PATENT DOCUMENTS

| | | | | |
|---|---|---|---|---|
| 3,891,905 | A | * | 6/1975 | Muller ...................... 318/400.41 |
| 4,684,839 | A | * | 8/1987 | Fujisaki et al. .......... 310/154.05 |
| 2006/0197392 | A1 | * | 9/2006 | Yang et al. .................. 310/67 R |
| 2007/0138904 | A1 | * | 6/2007 | Chae ............................. 310/268 |

FOREIGN PATENT DOCUMENTS

JP          05236717 A    *    9/1993

* cited by examiner

Primary Examiner — Tran Nguyen

(57) ABSTRACT

A fan assembly includes a stator and a rotor. The stator is located in a fan frame and includes a base, at least one magnetizing winding provided on the base at a first relative position relative to a center of the base, and at least one magnetic conductive element provided on the base at a second relative position relative to the center of the base. The rotor is fixedly mounted in a fan hub, and has at least one positive pole and at least one negative pole, which are alternately arranged to constitute a magnetic induction face. The fan hub is rotatably connected to the fan frame via a shaft with the magnetic induction face facing toward the magnetizing winding and the magnetic conductive element on the base. With the above arrangements, the fan can have a largely reduced axial height for use in a limited space.

8 Claims, 4 Drawing Sheets

STATOR STRUCTURE, AND MOTOR AND FAN ASSEMBLY USING SAME

FIELD OF THE INVENTION

The present invention relates to a stator structure, and a motor and a fan assembly using the stator structure. More particularly, the present invention relates to a stator structure that omits the conventional stator core and insulating frame to enable a motor and a fan assembly using such stator structure to have a largely reduced axial height.

BACKGROUND OF THE INVENTION

Most of the conventional motor structures include a base, a stator, and a rotor. The base is provided at a center thereof with a bearing cup for receiving a bearing, a retaining ring, a wear-resisting plate or an oil-sealing cap therein. The stator is fitted around the bearing cup. The rotor is provided at a center with a rotary shaft and a permanent magnet. The rotary shaft is rotatably associated with the bearing cup for the stator and the rotor to be assembled together to form a motor structure.

According to the above-described conventional motor structure, the motor operates due to excitation generated by mutual induction between the rotor and the stator. Therefore, the stator is a prerequisite element in the conventional motor structure. The stator in the conventional motor structure includes a plurality of laminated silicon steel sheets and insulating sheets, which is wound around by a coil. The stator with such structure has a fixed height, which prevents the motor structure to reduce its axial height. Further, the permanent magnet on the rotor also has a fixed height. Even if the rotor and the stator are basically parallel with each other in design, this design fails to reduce the axial space of the motor. Therefore, the conventional motor, due to its large axial height, could not be used in a small or narrow space. In brief, the conventional stator and motor have the following disadvantages: (1) there is restriction to the space for mounting them; and (2) they fail to meet the requirement for miniaturization.

SUMMARY OF THE INVENTION

To solve the problem in the conventional stator and motor structures, a primary object of the present invention is to provide a stator structure that enables a motor and a fan assembly using such stator structure to have a largely reduced axial height and can therefore be used at places having only a limited space.

Another object of the present invention is to provide a motor that uses the above-mentioned stator to thereby have a largely reduced axial height.

A further object of the present invention is to provide a fan assembly that uses the above-mentioned stator to thereby have a largely reduced axial height.

To achieve the above and other objects, the fan assembly according to the present invention includes a stator and a rotor. The stator is located in a fan frame and includes a base, at least one magnetizing winding provided on the base at a first relative position relative to a center of the base, and at least one magnetic conductive element provided on the base at a second relative position relative to the center of the base. The rotor is fixedly mounted in a fan hub, and has at least one positive pole and at least one negative pole, which are alternately arranged to constitute a magnetic induction face. The fan hub is rotatably connected to the fan frame via a shaft with the magnetic induction face facing toward the magnetizing winding and the magnetic conductive element on the base.

With the above arrangements, the fan can have a largely reduced axial height for use in a limited or narrow space.

The present invention provides the following advantages: (1) occupying only reduced space; (2) lowering the motor and fan manufacturing cost; (3) allowing the fan to have a relatively small torque; and (4) enabling the fan to have lowered power consumption.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
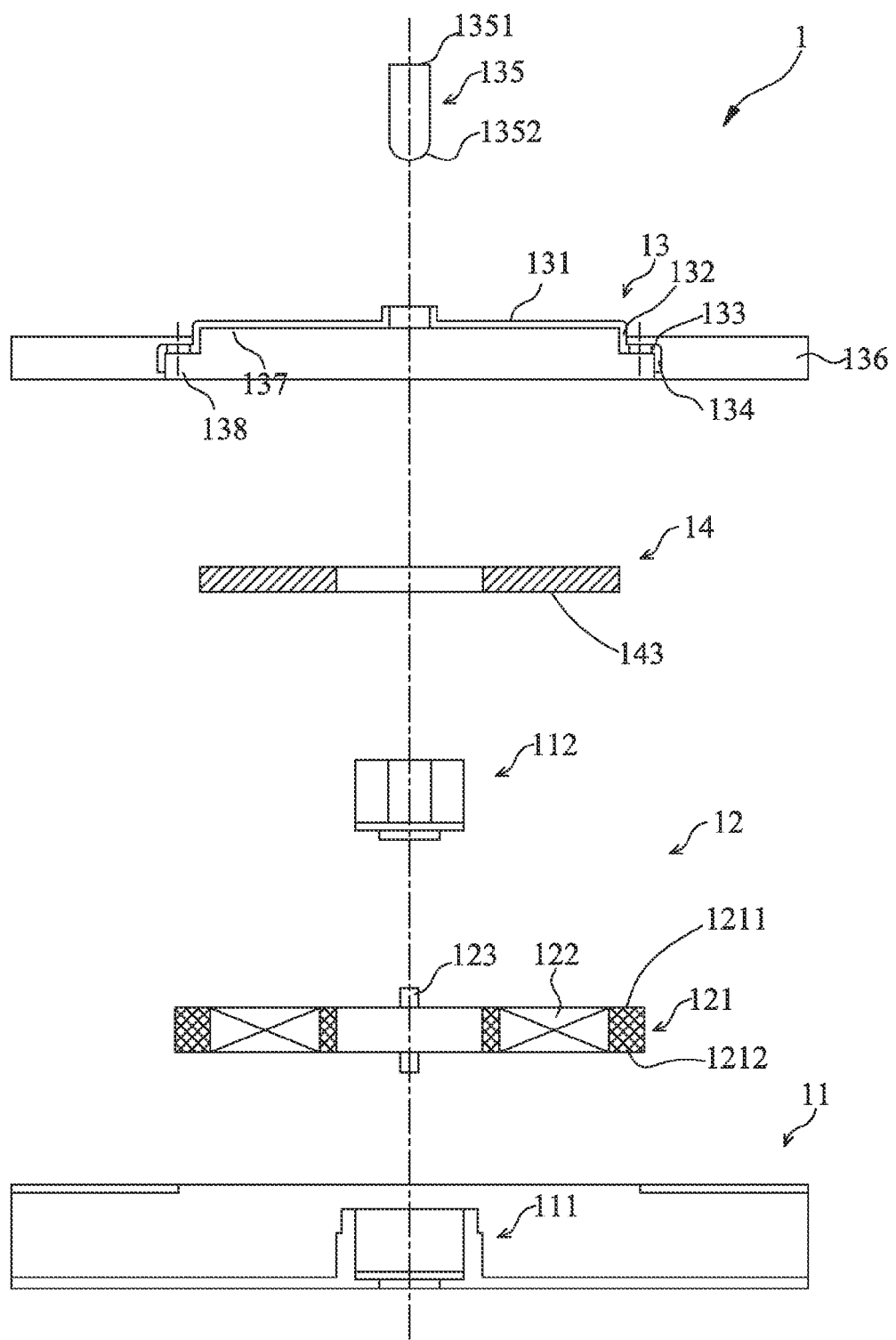
FIG. 1 is an exploded sectional view of a fan assembly according to an embodiment of the present invention.
Figure 2:
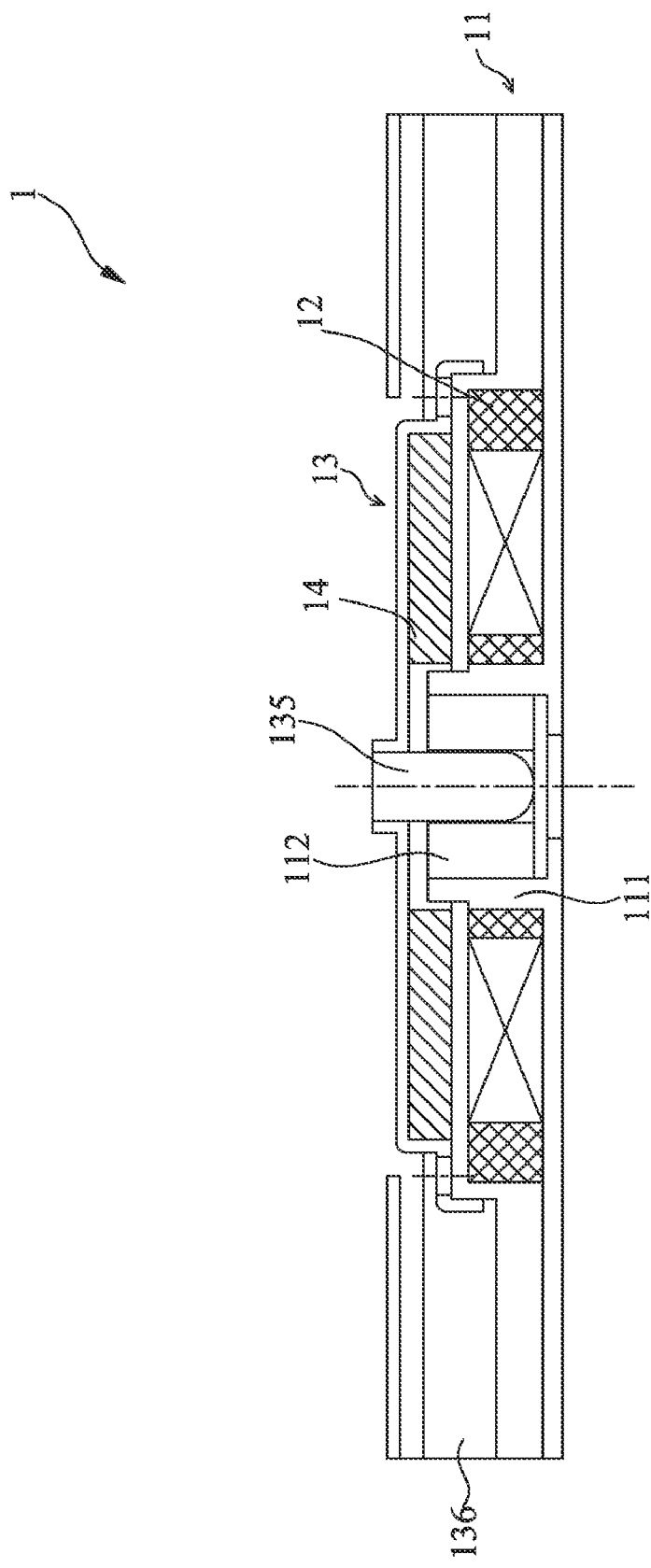
FIG. 2 is an assembled view of FIG. 1.

Please refer to FIGS. 1 and 2, which are exploded and assembled sectional views, respectively, of a fan assembly 1 according to an embodiment of the present invention. As shown, the fan assembly 1 includes a motor frame 11, a stator 12, a fan hub 13, and a rotor 14.

The motor frame 11 has a bearing cup 111 for receiving a bearing 112 therein. The stator 12 is located in the motor frame 11 and fitted around the bearing cup 111.

Figure 5:
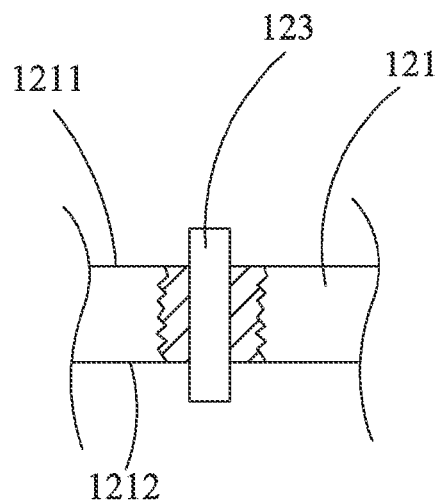
FIG. 5 is a fragmentary sectional view of the stator structure of the present invention.

The stator 12 includes a base 121, a magnetizing winding 122, and a magnetic conductive element 123. The base 121 has a top face 1211 and a bottom face 1212, which are located at two opposite sides of the base 121. Please also refer to FIG. 3, which is a top view of the base 121 for the stator 12. The base 121 further has a first relative position 1213 and a second relative position 1214 relative to a center of the base 121. The magnetizing winding 122 is located at the first relative position 1213 of the base 121, and is located between the top face 1211 and the bottom face 1212. The magnetic conductive element 123 is located at the second relative position 1214 of the base 121 without overlapping with the first relative position 1213, and is located between the top face 1211 and the bottom face 1212, as shown in FIG. 5.

The magnetizing winding 122 and the magnetic conductive element 123 are alternately arranged to space from each other. Another magnetizing winding 122 is correspondingly provided to locate opposite to the magnetizing winding 122; and another magnetic conductive element 123 is correspondingly provided to locate opposite the magnetic conductive element 123.

Figure 3:
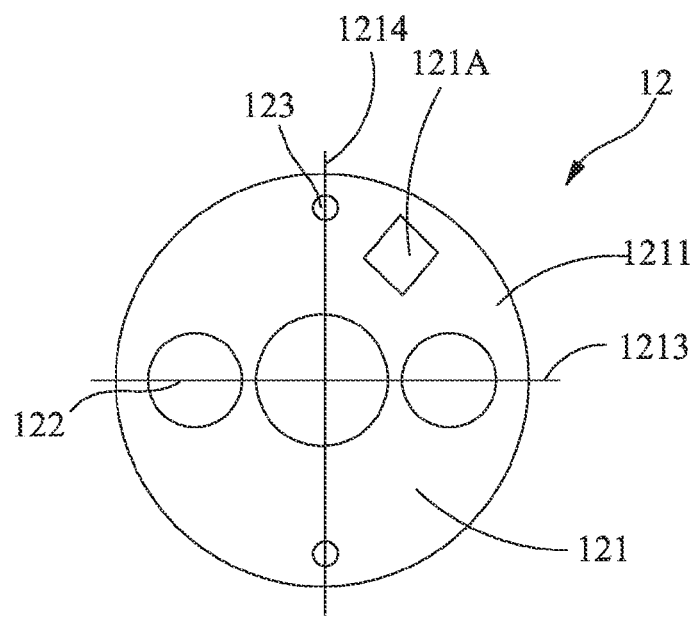
FIG. 3 is a top view of a base for a stator structure of the present invention.

An axis of the first relative position 1213 and an axis of the second relative position 1214 pass through the center of the base 121 to orthogonally intersect each other, as can be seen in FIG. 3.

Figure 6:
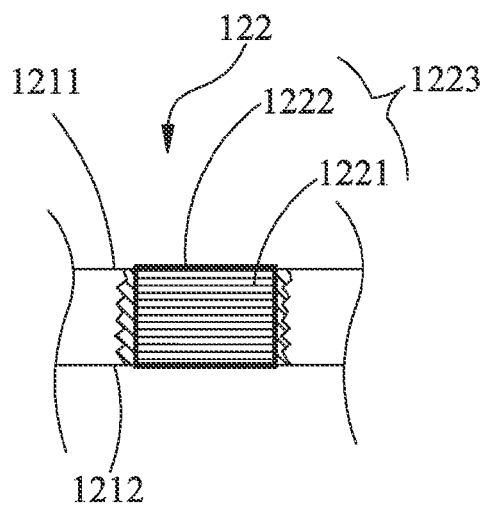
FIG. 6 is another fragmentary sectional view of the stator structure of the present invention.

The magnetizing winding 122 includes at least an armature wire 1221 and a case 1222. The armature wire 1221 is wound into an armature winding 1223, and the case 1222 encloses the armature winding 1223 therein. The case 1222 is made of a resin material. The armature winding 1223 is embedded in the base 121, as shown in FIG. 6.

The magnetic conductive element 123 is inserted in the base 121 with two ends of the magnetic conductive element 123 located corresponding to the top face 1211 and the bottom face 1212. The magnetic conductive element 123 is selected from the group consisting of rubidium-iron-boron (Ru—Fe—B) and ferrite.

The base 121 further has an integrated element 121A, which is attached to the top face 1211 of the base 121.

As can be seen from FIGS. 1 and 2, the fan hub 13 includes a first section 131, a second section 132, a third section 133, a fourth section 134, and a shaft 135. The first section 131 has an outer periphery being downward bent and extended to form the second section 132; a lower periphery of the second section 132 is radially outward extended to form the third section 133; and an outer periphery of the third section 133 is vertically downward extended to form the fourth section 134. The shaft 135 has a first end 1351 connected to the first section 131 and a second end 1352 extended through the bearing 112, such that the shaft 135 is rotatably received in the bearing 112. The fan hub 13 is rotatably mounted in the motor frame 11.

The fan hub 13 further includes a plurality of blades 136, which are radially outward extended from the fan hub 13.

Figure 4:
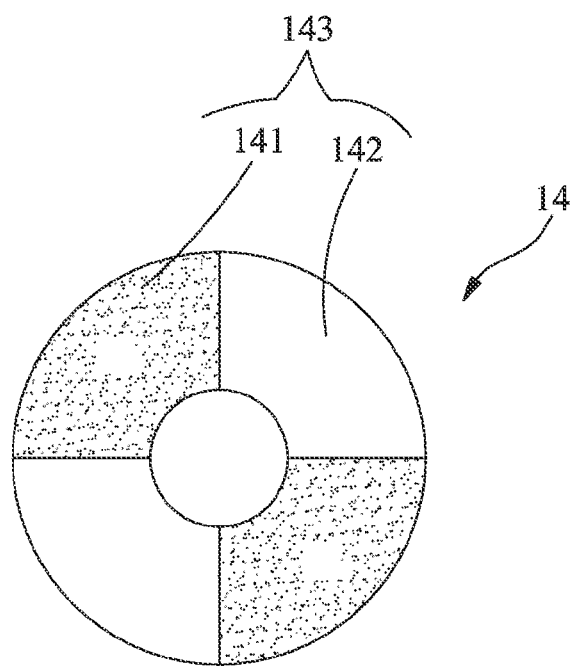
FIG. 4 is a bottom view of a rotor for a motor according to the present invention.

The rotor 14 is located between the first section 131 and the second section 132 of the fan hub 13, and, as shown in FIG. 4, includes at least a positive pole 141 and at least a negative pole 142. The positive pole 141 is located closely adjacent to the negative pole 142. And, the positive pole 141 and the negative pole 142 are alternately arranged to constitute a magnetic induction face 143, which is oriented toward the top face 1211 of the base 121.

The first section 131 and the second section 132 of the fan hub 13 together define a first space 137, and the third section 133 and the fourth section 134 of the fan hub 13 together define a second space 138. The rotor 14 is received in the first space 137. The second space 138 is oriented toward the base 121.

The fan assembly with the above-described stator structure and a motor using the stator provides the following advantages:
(1) The stator does not include any core and insulating frame to enable a largely reduced axial height thereof.
(2) Since the core is omitted, no magnetic lag due to slot effect will occur. Therefore, the motor can be started at a low voltage and have a small torque to reduce the power consumption thereof.
(3) By providing the magnetic conductive element on the base, it is able to achieve a magnetic localization function to facilitate single-phase IC control and reduced motor manufacturing cost.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A stator structure, comprising:
    a base having a top face and a bottom face;
    at least one magnetizing winding being provided on a first relative position relative to a center of the base, and located between the top face and the bottom face; and
    at least one magnetic conductive element being provided on a second relative position relative to the center of the base, the second relative position being separated from and not overlapping the first relative position, and located between the top face and the bottom face.

2. The stator structure as claimed in claim 1, wherein the first relative position and the second relative position have an axis each, and the two axes pass through the center of the base to orthogonally intersect each other.

3. The stator structure as claimed in claim 1, wherein the magnetizing winding and the magnetic conductive element are alternately arranged to space from each other, and the magnetizing winding being arranged corresponding and opposite to another magnetizing winding, and the magnetic conductive element being arranged corresponding and opposite to another magnetic conductive element.

4. The stator structure as claimed in claim 2, wherein the magnetizing winding and the magnetic conductive element are alternately arranged to space from each other, and the magnetizing winding being arranged corresponding and opposite to another magnetizing winding, and the magnetic conductive element being arranged corresponding and opposite to another magnetic conductive element.

5. The stator structure as claimed in claim 1, wherein the magnetizing winding includes at least an armature wire and a case; the armature wire being wound into an armature winding, and the case enclosing the armature winding therein.

6. The stator structure as claimed in claim 1, wherein the magnetic conductive element is inserted in the base with two ends of the magnetic conductive element located corresponding to the top face and the bottom face of the base.

7. A motor, comprising:
    a stator including
        a base having a top face and a bottom face;
        at least one magnetizing winding being provided on a first relative position relative to a center of the base, and located between the top face and the bottom face; and
        at least one magnetic conductive element being provided on a second relative position relative to the center of the base, the second relative position being separated from and not overlapping the first relative position, and located between the top face and the bottom face; and
    a rotor having at least one positive pole and at least one negative pole; the positive pole being located closely adjacent to the negative pole; the positive pole and the negative pole being alternately arranged to constitute a magnetic induction face, which is oriented toward the top face of the base.

8. A fan assembly, comprising:
    a motor frame being provided with a bearing cup for receiving a bearing therein;
    a stator being located in the motor frame and fitted around the bearing cup; the stator including
        a base having a top face and a bottom face;
        at least one magnetizing winding being provided on a first relative position relative to a center of the base, and located between the top face and the bottom face;
        at least one magnetic conductive element being provided on a second relative position relative to the center of the base, the second relative position being separated from and not overlapping the first relative position, and located between the top face and the bottom face; and a fan hub having a first section, a second section, a third section, a fourth section, and a shaft; the first section having an outer periphery being downward bent and extended to form the second section; a lower periphery of the second section being radially outward extended to form the third section; and an outer periphery of the third section being vertically downward extended to form the fourth section; the shaft having a first end connected to the first section and a second end extended through and received in the bearing; and the fan hub being rotatably mounted in the motor frame; and a rotor being located between the first section and the second section of the fan hub, and having at least one positive pole and at least one negative pole; the positive pole being located closely adjacent to the negative pole; the positive pole and the negative pole being alternately arranged to constitute a magnetic induction face, which is oriented toward the top face of the base.

* * * * *